US010240710B2

(12) United States Patent
Boudreau et al.

(10) Patent No.: US 10,240,710 B2
(45) Date of Patent: Mar. 26, 2019

(54) INSULATION COMPRESSION REDUCTION ASSEMBLY FOR PIPING SYSTEMS

(71) Applicant: 9380671 CANADA INC., Sainte Marguerite du lac Masson (CA)

(72) Inventors: Martin Boudreau, Sainte Marguerite du lac Masson (CA); Christian Montplaisir, Sainte Adéle (CA)

(*) Notice: Subject to any disclaimer, the term of this patent is extended or adjusted under 35 U.S.C. 154(b) by 0 days.

(21) Appl. No.: 15/511,483

(22) PCT Filed: Sep. 15, 2015

(86) PCT No.: PCT/CA2015/050889
§ 371 (c)(1),
(2) Date: Mar. 15, 2017

(87) PCT Pub. No.: WO2016/041066
PCT Pub. Date: Mar. 24, 2016

(65) Prior Publication Data
US 2017/0284589 A1 Oct. 5, 2017

Related U.S. Application Data

(60) Provisional application No. 62/050,520, filed on Sep. 15, 2014.

(51) Int. Cl.
*F16L 59/135* (2006.01)
*F16L 59/12* (2006.01)
(Continued)

(52) U.S. Cl.
CPC ............. *F16L 59/12* (2013.01); *F16L 3/02* (2013.01); *F16L 59/135* (2013.01); *F16L 59/14* (2013.01); *F16L 3/00* (2013.01); *F16L 3/08* (2013.01)

(58) Field of Classification Search
CPC ......... F16L 59/12; F16L 59/14; F16L 59/125; F16L 59/135; F16L 59/143; F16L 3/02;
(Continued)

(56) References Cited

U.S. PATENT DOCUMENTS 3,122,346 A    2/1964  Seller
4,858,861 A *  8/1989  Wilkinson, III ...... F16L 3/1033
                                                        24/514
(Continued)

OTHER PUBLICATIONS

International Search Report and Written Opinion for International PCT No. PCT/CA2015/050889, dated Dec. 18, 2015, pp. 1-7.
(Continued)

*Primary Examiner* — Nkeisha Smith
(74) *Attorney, Agent, or Firm* — Brinks Gilson & Lione

(57) ABSTRACT

An insulation compression reduction assembly for reducing compression of an insulating material surrounding a horizontally extending pipe in combination with a pipe support supporting said pipe. The compression reduction assembly includes a base pressure skate element sized and shaped to fit within the pipe support, a pipe holder structure sized and shaped to rest against an outer surface of the horizontal extending pipe, and a spacing element connecting the base pressure skate element and the pipe holder structure and forming an offset spacing therebetween for reducing compression of the insulating material. An insulation compression reduction kit of disassembled components of the above assembly that can be used to form the above compression reduction assembly is also provided according to the present invention.

16 Claims, 12 Drawing Sheets

(51) Int. Cl.
*F16L 3/02* (2006.01)
*F16L 59/14* (2006.01)
*F16L 3/00* (2006.01)
*F16L 3/08* (2006.01)

(58) Field of Classification Search
CPC ....... F16L 3/00; F16L 3/08; F16L 3/24; F16L 3/127
USPC ............ 248/49, 74.4, 74.1, 63, 58, 62
See application file for complete search history.

(56) References Cited

U.S. PATENT DOCUMENTS

| | | | | |
|---|---|---|---|---|
| 5,381,833 | A * | 1/1995 | Cummings | F16L 59/135 138/107 |
| 5,924,656 | A | 7/1999 | Okada et al. | |
| 6,691,742 | B1 * | 2/2004 | Cooper | F16L 3/14 138/106 |
| 7,213,790 | B2 | 5/2007 | Bailey et al. | |
| 8,870,132 | B2 * | 10/2014 | Sampson | F16L 3/123 248/62 |
| 8,894,023 | B2 * | 11/2014 | Dann | F16L 3/127 248/58 |
| 2009/0178723 | A1 * | 7/2009 | Cioffi | F16L 59/022 138/107 |
| 2017/0198733 | A1 * | 7/2017 | Fay | F16B 2/22 |

OTHER PUBLICATIONS

Supplementary European Search Report dated May 4, 2018, for corresponding European Patent Application Serial No. EP 15 84 2317.

* cited by examiner

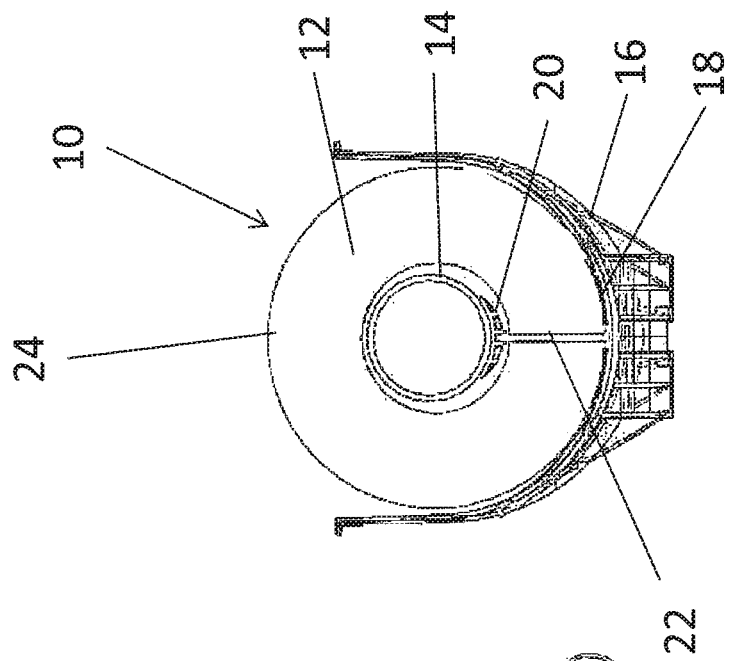
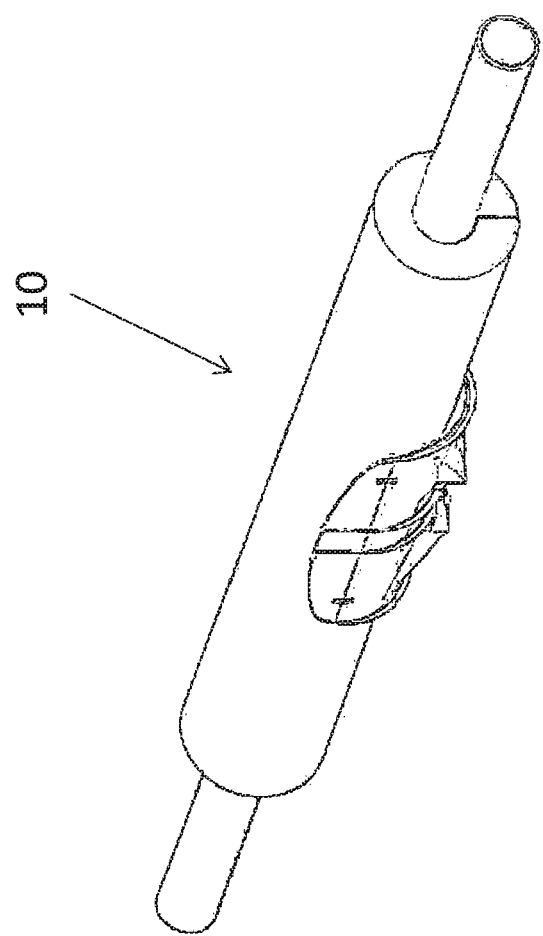
Fig. 8A
Fig. 8B

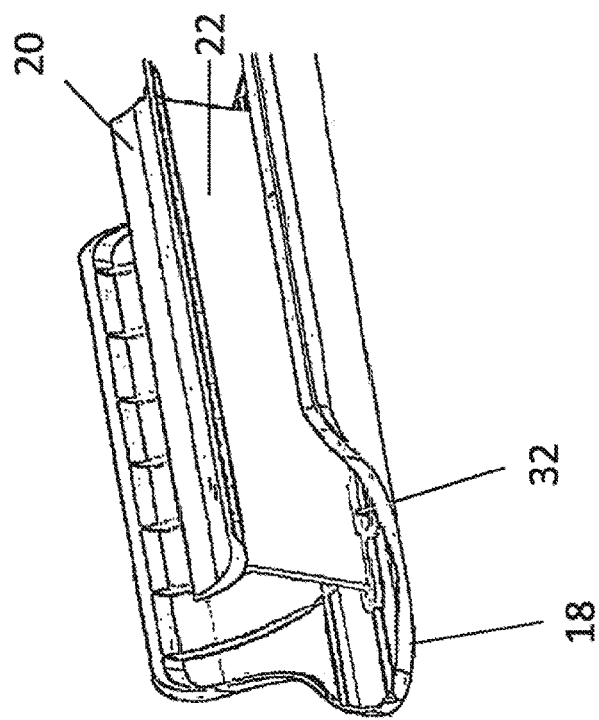
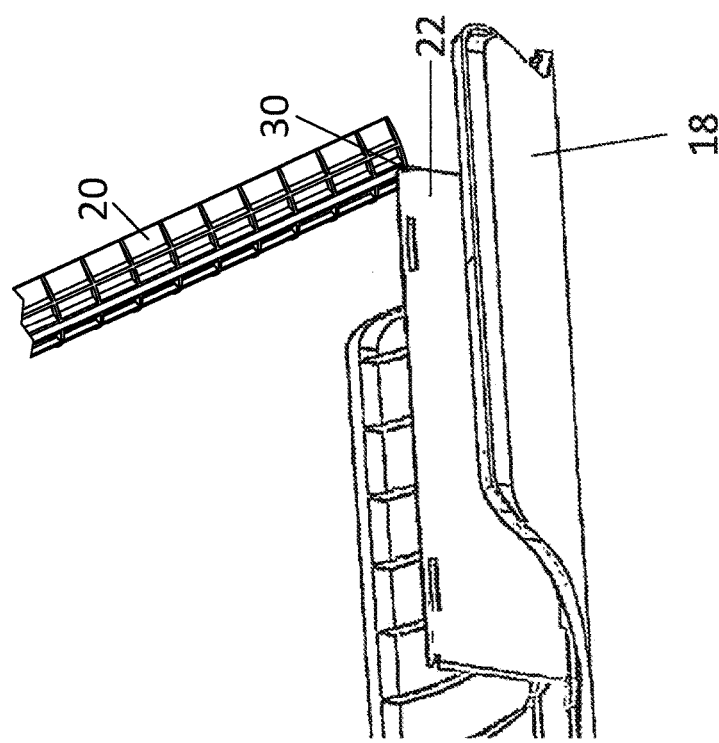

INSULATION COMPRESSION REDUCTION ASSEMBLY FOR PIPING SYSTEMS

CROSS-REFERENCE TO RELATED APPLICATIONS

This applications is a National Stage of International Application No. PCT/CA2015/050889 filed with the Canadian Patent Office on Sep. 15, 2015, which claims priority to U.S. provisional patent application No. 62/050,520 filed Sep. 15, 2014, wherein the entirety of each of the aforementioned applications is hereby incorporated herein by reference.

FIELD OF THE INVENTION

The present invention relates to pipe supports. More particularly, it relates to an insulation compression reduction assembly to be used with a pipe support providing enhanced support to pipes extending horizontally in piping systems. A kit of unassembled components of the above assembly that can be assembled together for providing the same is also provided.

BACKGROUND OF THE INVENTION

In commercial and industrial constructions, horizontally running pipe systems are most commonly supported using a series of U-shaped pipe supporting members, such as clevis hangers, affixed to the ceiling or to any other overhead surface, and disposed at variable distances.

The pipe conduits often convey material at a temperature substantially higher or lower from the ambient temperature. In such cases, the pipe conduits usually require thermal insulation in order to prevent changes in the temperature of the conveyed material, due to heat transfer occurring at the pipe surface. Thermal insulation is also very effective in preventing the formation of condensation at the surface of the pipe in the case where the conveyed fluid material is colder than the ambient temperature, thereby avoiding premature rusting of the components of the pipe supporting system as well as water drops falling to the ground in the case of constructions where pipe systems are visible, e.g. warehouses, underground parking lots, or the like.

In the above-mentioned configuration, the pipe or the thermal insulation envelope covering the pipe usually rests directly on the U-shaped metal strips of the supporting members, which creates several problems, mostly caused by the sharp edges of the U-shaped metal strips and their relatively narrow width.

Firstly, when a thermal insulation envelope covers a pipe, traditional U-shaped pipe supporting members tend to crush the insulation layer at the support points. This is mostly due to the usual fragility of commonly used pipe insulation material and to the pressure being applied over a narrow contact surface between a support and the insulated pipe. This crushing of the insulation material causes a decrease in the thickness of the insulation layer of the pipe, negatively impacting on the overall insulation of the pipe. Furthermore, friction and vibration, which always occur at the support points, further degrade the insulation and can lead to rupture in the insulation envelope which further reduces the insulation of the pipe system. The reduction in insulation is often exacerbated by the conductive heat transfer between the pipe and the holder, since both components are often made of heat conductive material.

In addition, subsequent installation or replacement of thermal insulation over a length of pipe often proves to be a long and arduous job for workers attending to these tasks. The common method for installing an insulated pipe usually involves two steps. In the first step, a technician secures the U-shaped supporting members to the overhead surface and inserts the section of pipes in the supporting members. In the second step, an insulation technician covers the pipes with an insulation layer. This insulation layer is typically cut lengthwise. In this last step, the supporting members cause difficulties as they prevent the sliding of the insulation layer on the pipes at the contact points.

Hence, in light of the aforementioned, there is a need for an insulation compression reduction assembly, which by virtue of its design and components, would be able to overcome or at least minimize some of the above-discussed prior art concerns.

SUMMARY OF THE INVENTION

According to one aspect of the present invention, there is provided an insulation compression reduction assembly for reducing compression of an insulating material surrounding a horizontally extending pipe in combination with a pipe support supporting said pipe. The compression reduction assembly includes a base pressure skate element sized and shaped to fit within the pipe support, a pipe holder structure sized and shaped to rest against an outer surface of the horizontal extending pipe, and a spacing element connecting the base pressure skate element and the pipe holder structure and forming an offset spacing therebetween for reducing compression of the insulating material. An insulation compression reduction kit of disassembled components of the above assembly that can be used to form the above compression reduction assembly is also provided according to the present invention.

Advantageously, the insulation compression reduction assembly and kit described hereinabove offers a solution to the crushing of the insulation layer covering the pipes by providing an offset space between the pipe and the pipe support.

The objects, advantages and features of the present invention will become more apparent upon reading the following non-restrictive description of a preferred embodiment thereof, given for the purpose of exemplification only, with reference to the appended drawings.

BRIEF DESCRIPTION OF THE DRAWINGS

For a better understanding of the invention and to show how the same may be carried into effect, reference is now made by way of example to the accompanying drawings in which:

FIGS. 8A and 8B are perspective and front views respectively of an insulation compression reduction assembly according to another preferred embodiment of the present invention, shown in combination with a pipe support, pipe and insulating material as part of its immediate surrounding.

FIGS. 12A and 12B are perspective views illustrating a connection of the spacing element of the insulation compression reduction assembly shown in FIGS. 8A and 8B to a pipe holder structure.

DETAILED DESCRIPTION OF THE INVENTION

In the following description, the same numerical references refer to similar elements. The embodiments, geometrical configurations, materials mentioned and/or dimensions shown in the figures or described in the present description are preferred embodiments only, given solely for exemplification purposes.

Moreover, although the preferred embodiment of the compression reduction assembly and corresponding parts thereof consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation thereinbetween, as well as other suitable geometrical configurations, may be used for the compression reduction assembly according to the present invention, as will be briefly explained herein and as can be easily inferred herefrom, by a person skilled in the art, without departing from the scope of the invention.

Figure 1:
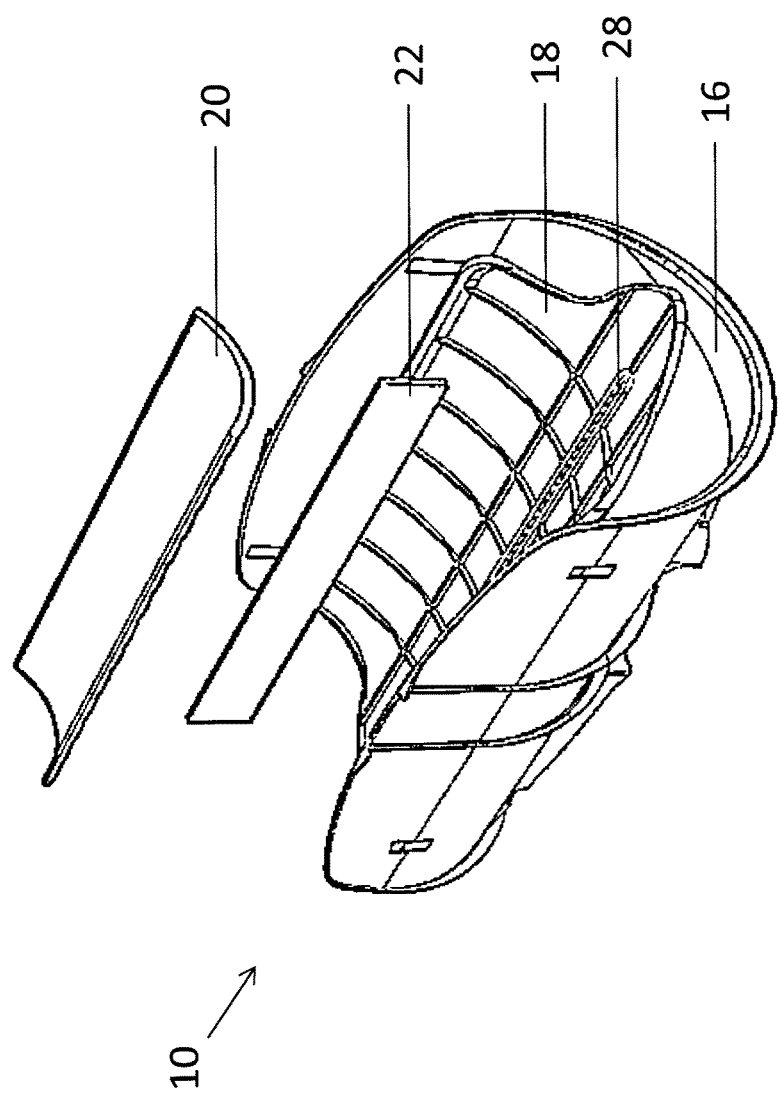
FIG. 1 is a perspective exploded view of an insulation compression reduction assembly according to a preferred embodiment of the present invention, shown in combination with a pipe support as part of its immediate surrounding.
Figure 2:
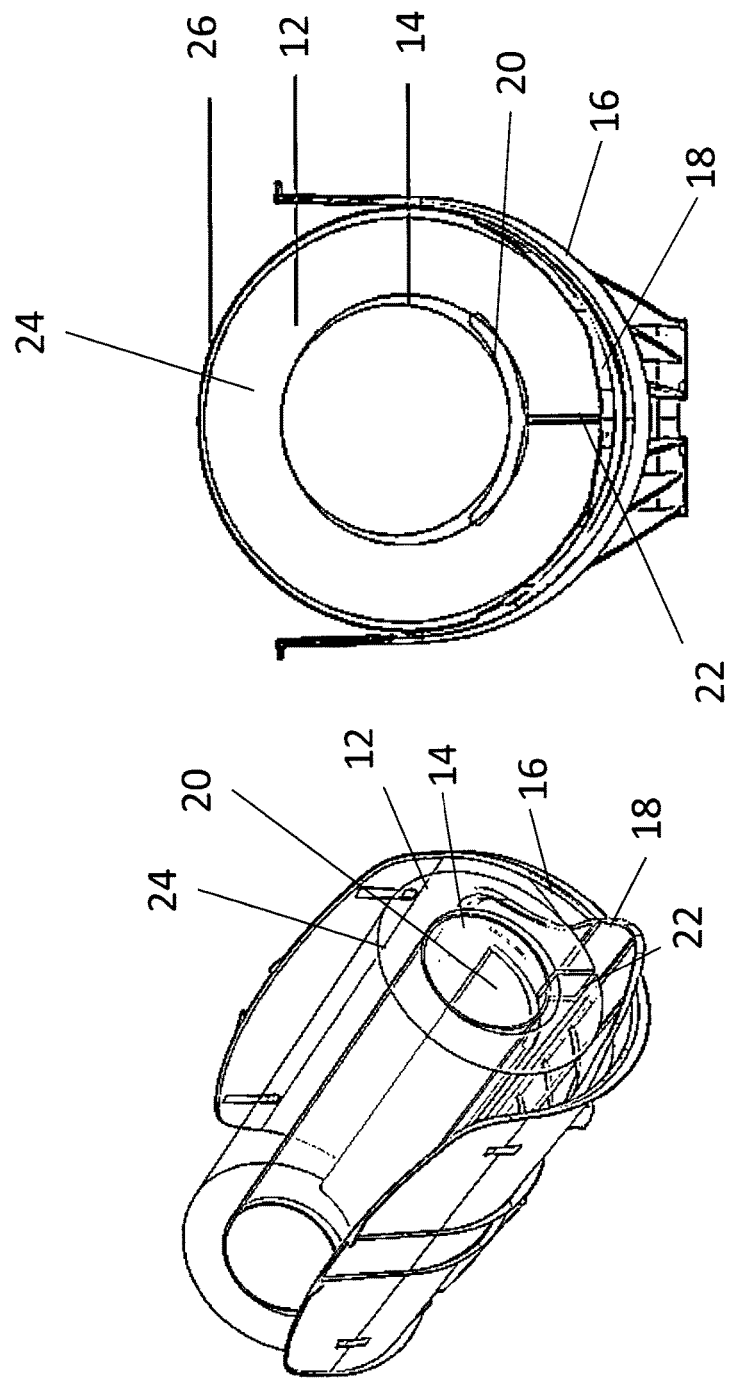
FIGS. 2A and 2B are perspective and front views respectively of an insulation compression reduction assembly according to a preferred embodiment of the present invention, shown in combination with a pipe support, pipe and insulating material as part of its immediate surrounding.
Figure 3:
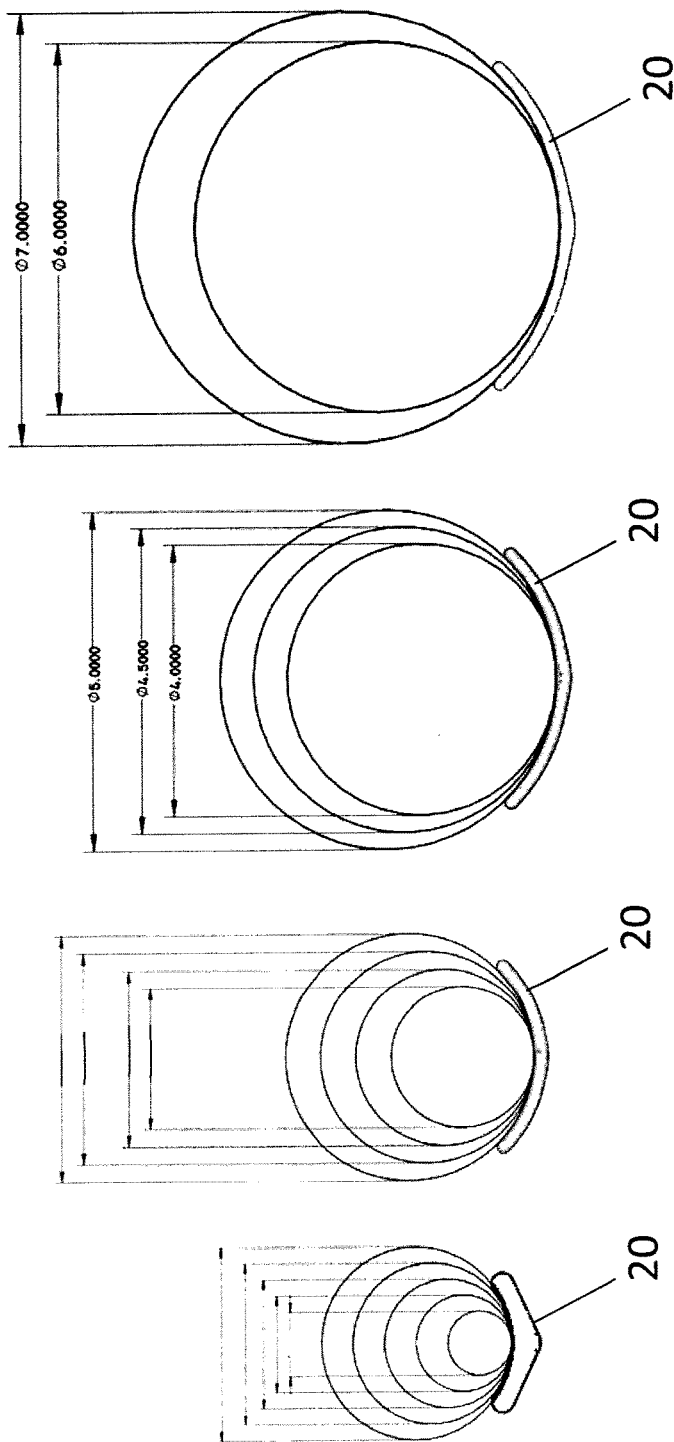
FIG. 3 is a front view of a plurality of differently sized pipe holder structures according to preferred embodiments.
Figure 4B:
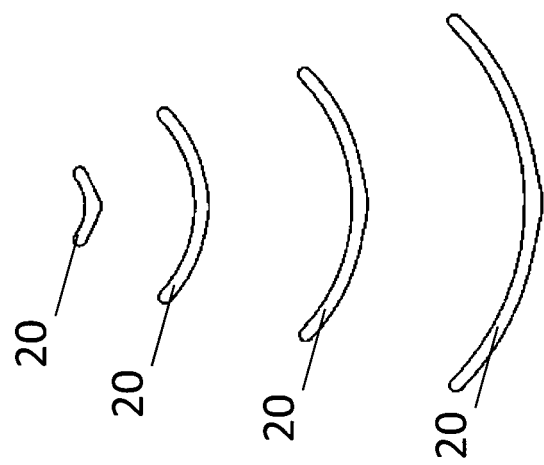
FIGS. 4A and 4B are perspective and front views of the plurality of differently sized pipe holder structures shown in FIG. 3.
Figure 4A:
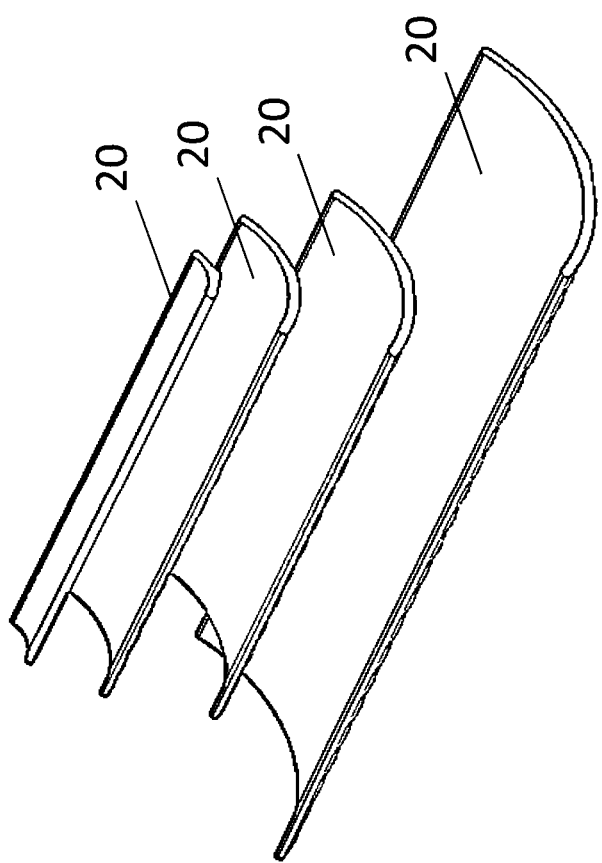
Figure 5:
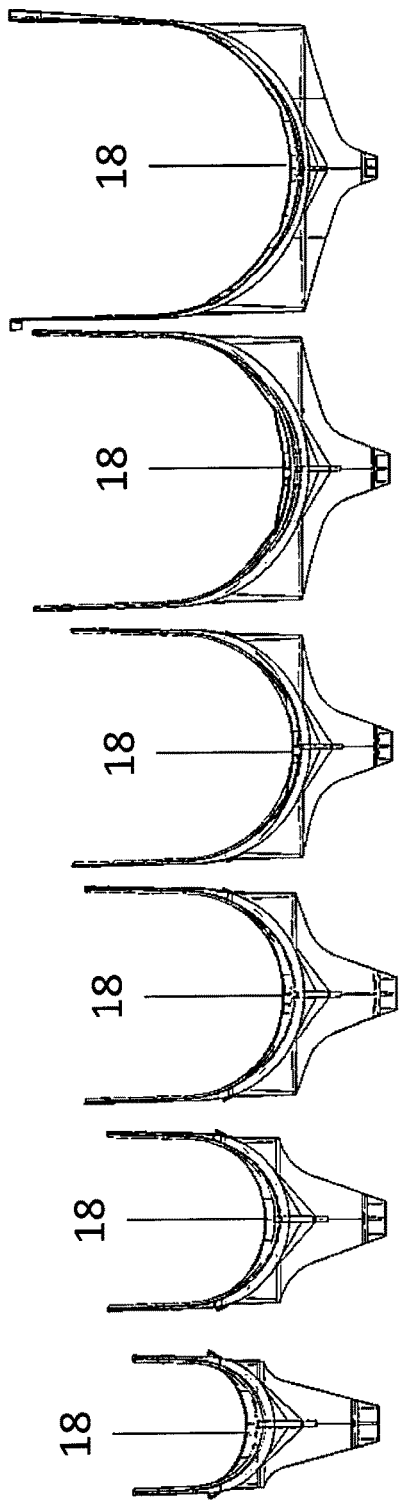
FIG. 5 is a front view of a plurality of differently sized base pressure skate elements installed in pipe supports according to preferred embodiments.
Figure 6B:
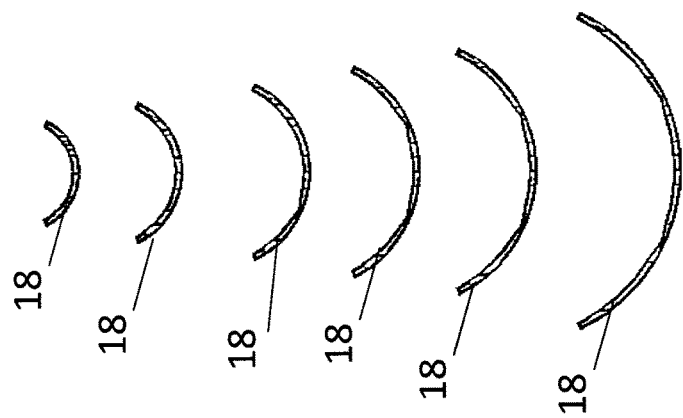
FIGS. 6A and 6B are perspective and front views of the plurality of differently sized base pressure skate elements shown in FIG. 5.
Figure 6A:
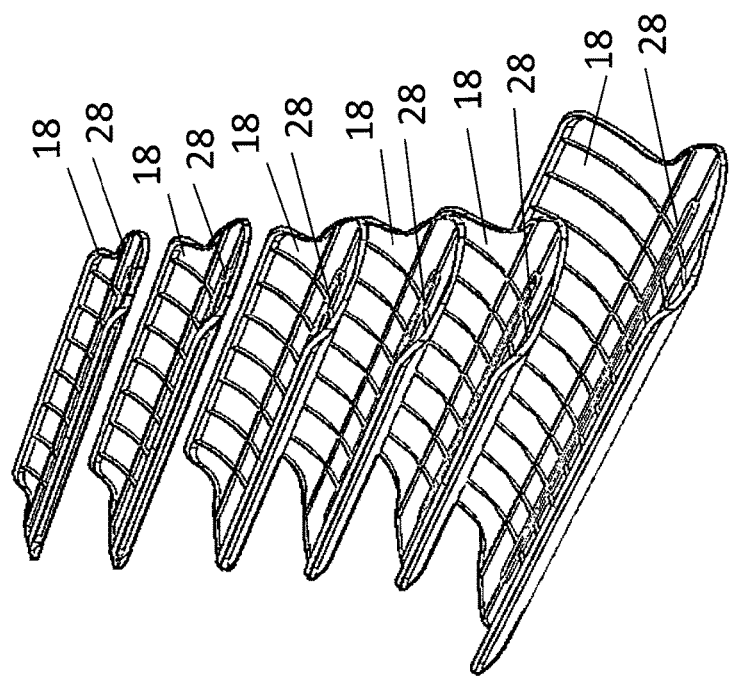
Figure 7:
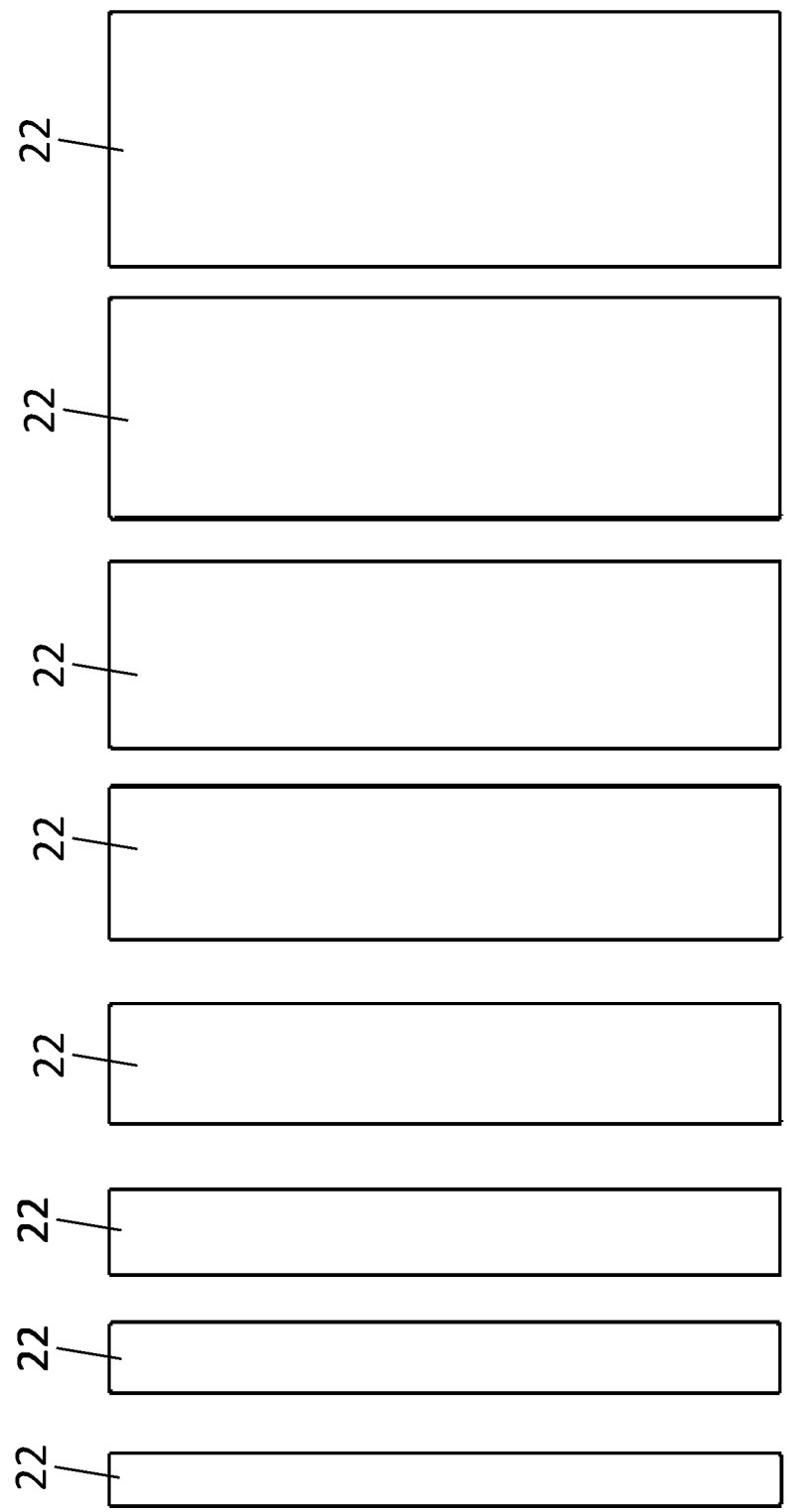
FIG. 7 includes side and front views of a plurality of differently sized spacing elements according to preferred embodiments.
Figure 9:
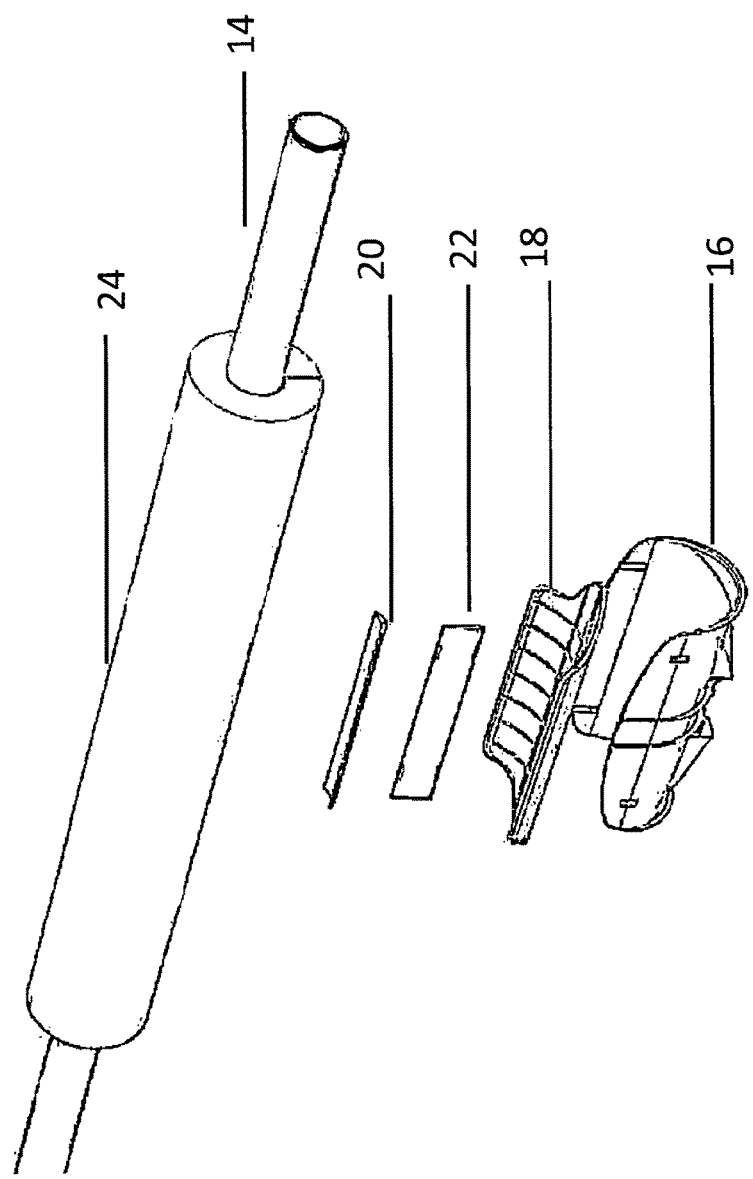
FIG. 9 is an exploded view of the insulation compression reduction assembly shown in FIGS. 8A and 8B.
Figure 10:
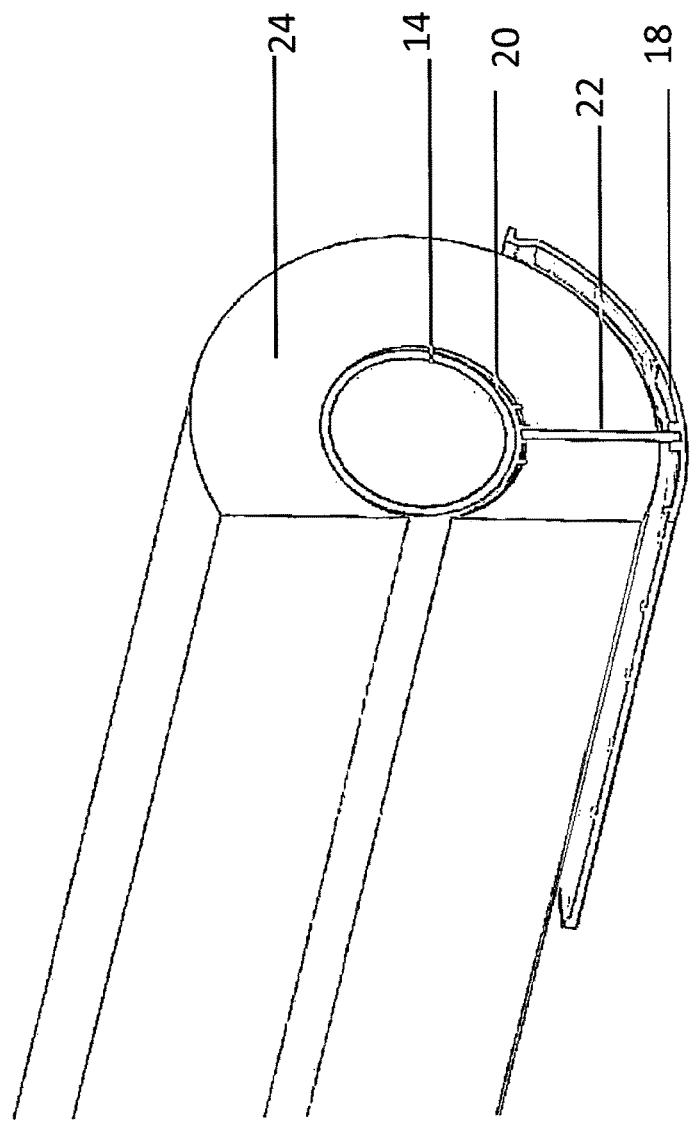
FIG. 10 is a perspective partially cut view of the insulation compression reduction assembly shown in FIGS. 8A and 8B.
Figure 11B:
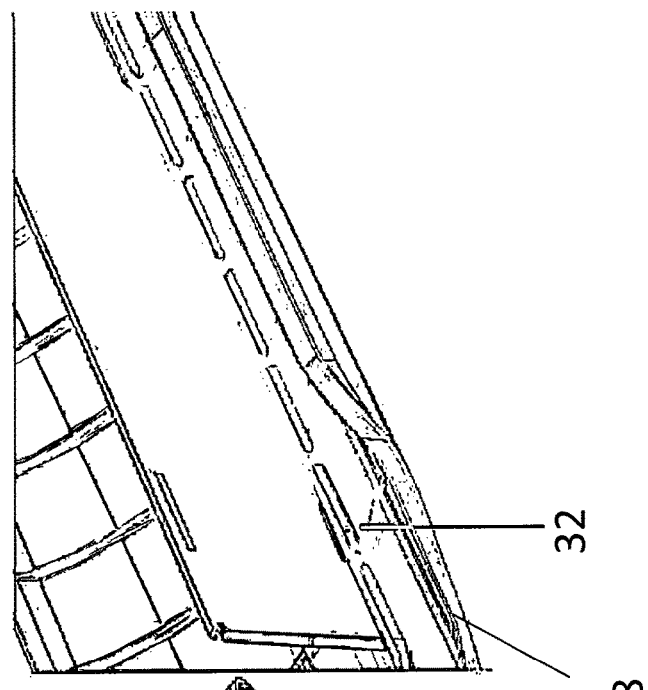
FIGS. 11A and 11B are perspective views illustrating a connection of the spacing element of the insulation compression reduction assembly shown in FIGS. 8A and 8B to a base pressure skate element.
Figure 11A:
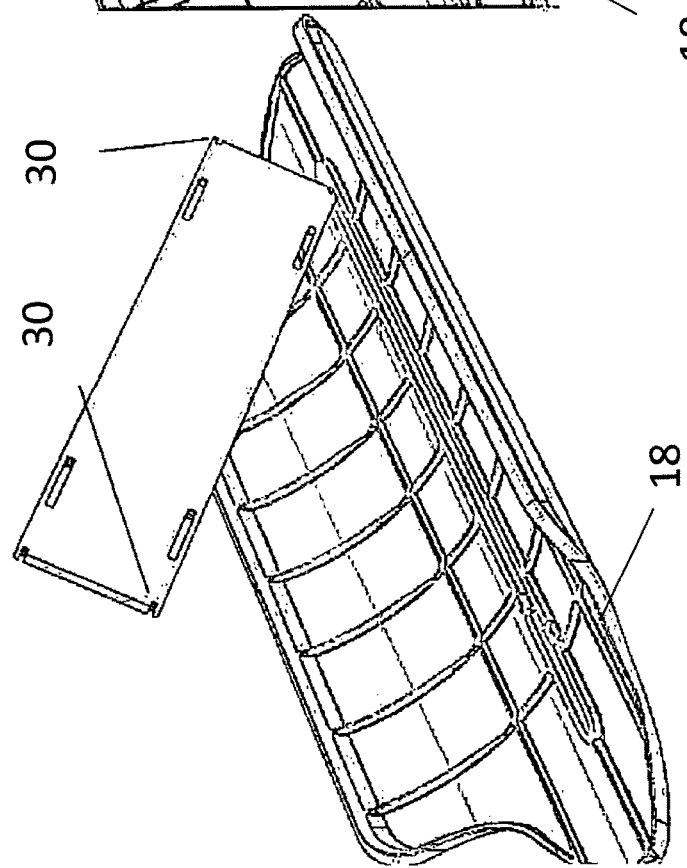

In accordance with one aspect of the present invention and as better illustrated in FIG. 1, 2A and 2B, there is provided an insulation compression reduction assembly 10 for reducing compression of an insulating material 12 surrounding a horizontally extending pipe 14 in combination with a pipe support 16 supporting said pipe 14. The pipe support 16 can be supported by a strut from below or extend from a vertical hanger to support said pipe support 16 from above. The compression reduction assembly 10 includes a base pressure skate element 18 sized and shaped to fit within the pipe support, a pipe holder structure 20 sized and shaped to rest against an outer surface of the horizontal extending pipe, and a spacing element 22 connecting the base pressure skate element 18 and the pipe holder structure 20 and forming an offset spacing therebetween for reducing compression of the insulating material 12. This is particularly useful when the pipe support supports a heavy pipe, as compression of the insulating material can create thermal bridges and hence losses of energy through contact of the pipe with the pipe support.

As better shown in FIGS. 2A and 2B, in some implementations, the offset spacing formed between the base pressure skate element 18 and the pipe holder structure 20 is shaped to receive opposite extremities formed along a split line of an insulation tube 24. In the figures, the insulation tube is illustrated as a semi-split insulation tube. However, any type of insulation tube can be used with the present invention. In some scenarios, the insulation tube may not be provided with a pre-defined split line. In such cases, the installer can locally slice open a portion of the insulation tube to allow installation of the compression reduction assembly around this localized area of the otherwise unsplit tube. The insulation tube 24 can further comprise a vapour barrier 26 on an external surface of the tube.

In some implementations, the base pressure skate element 18 includes a slotted portion 28 shaped and sized to receive the spacing element 22.

Similarly, in some implementations, although not illustrated in the figures, the pipe holder structure 20 also includes a slotted portion shaped and sized to receive the spacing element 22.

FIGS. 3 to 7 show how a plurality of differently sized and shaped base pressure skate elements 18, pipe holder structures 20, and spacing elements 22 can be provided to adapt to differently sized pipes and pipe supports. A kit of these differently sized components can be provided for various applications As better shown in FIG. 7, in some implementations, the spacing element 22 is shaped as a flat rectangular bar element.

FIGS. 8A to 12B show an insulation compression reduction assembly according to another preferred embodiment of the present invention. As better shown in FIGS. 11A to 12B, in some implementations, the spacing element 22 can include undercut teeth 30 sat a corresponding corner of the spacing element, the undercut teeth shaped and sized to improve connections with the base pressure skate element 18 (as shown in FIGS. 11A-11B) and the pipe holder structure 20 (as shown in FIGS. 12A-12B). In some implementations, the spacing element 22 can also be snapfittedly connected through snapfit connections 32 to the base pressure skate element 18 and the pipe holder structure 20.

It will be readily understood by one skilled in the art that the above-mentioned embodiment is merely illustrative of the possible specific embodiments which may represent principles of the present invention. Of course, numerous modifications could be made to the embodiment described above without departing from the scope of the present invention as defined in the appended claims.

The invention claimed is:

1. An insulation compression reduction assembly for reducing compression of an insulating material surrounding a horizontally extending pipe in combination with a U-shaped pipe support supporting the pipe, the compression reduction assembly comprising:
   a base pressure skate element configured to engage with the U-shaped pipe support and being sized and shaped to be entirely positioned above an inner surface of the U-shaped pipe support;

a pipe holder structure sized and shaped to be at least partially received within the U-shaped pipe support and to rest against an outer surface of the horizontally extending pipe;

a spacing element being at least partially received within the U-shaped pipe support and connecting the base pressure skate element and the pipe holder structure and forming an offset spacing therebetween;

wherein the U-shaped pipe support supporting the pipe and the insulating material is supportable by one of a strut from below and a vertical hanger from above;

wherein the base pressure skate element comprises a slotted portion shaped and sized to receive the spacing element; and wherein the pipe holder structure comprises a slotted portion shaped and sized to receive the spacing element.

2. The compression reduction assembly of claim 1, wherein the offset spacing formed between the base pressure skate element and the pipe holder structure is shaped to receive opposite extremities formed along a split line of an insulation tube.

3. The compression reduction assembly of claim 1, wherein the spacing element is shaped as a flat bar element.

4. The compression reduction assembly of claim 3, wherein the spacing element comprises at least one undercut tooth at a corresponding corner of the spacing element, the undercut tooth shaped and sized to improve a connection with at least one of the base pressure skate element and the pipe holder structure.

5. An insulation compression reduction kit for reducing compression of an insulating material surrounding a horizontally extending pipe in combination with a U-shaped pipe support supporting the pipe, the compression reduction kit comprising:

a base pressure skate element sized and shaped to be fittable within the U-shaped pipe support;

a pipe holder structure sized and shaped to be receivable within the U-shaped pipe support and to be restable against an outer surface of the horizontally extending pipe; and a spacing element being receivable within the U-shaped pipe support and connectable to the base pressure skate element and the pipe holder structure for forming an offset spacing therebetween, the spacing element further being configured to be disconnected from the base pressure skate element and from the pipe holder structure;

wherein the U-shaped pipe support supporting the pipe and the insulating material is supportable by one of a strut from below and a vertical hanger from above;

wherein the base pressure skate element comprises a slotted portion shaped and sized to receive the spacing element; and wherein the pipe holder structure comprises a slotted portion shaped and sized to receive the spacing element.

6. The compression reduction kit of claim 5, wherein the offset spacing formed between the base pressure skate element and the pipe holder structure is shaped to receive opposite extremities formed along a split line of an insulation tube.

7. The compression reduction kit of claim 5, wherein the spacing element is shaped as a flat bar element.

8. The compression reduction kit of claim 7, wherein the spacing element comprises at least one undercut tooth at a corresponding corner of the spacing element, the undercut tooth shaped and sized to improve a connection with at least one of the base pressure skate element and the pipe holder structure.

9. An insulation compression reduction kit for reducing compression of an insulating material surrounding a horizontally extending pipe in combination with a U-shaped pipe support supporting the pipe, the compression reduction kit comprising:

a base pressure skate element sized and shaped to be fittable within the U-shaped pipe support;

a pipe holder structure sized and shaped to be receivable within the U-shaped pipe support and to be restable against an outer surface of the horizontally extending pipe; and a spacing element being receivable within the U-shaped pipe support and connectable to the base pressure skate element and the pipe holder structure for forming an offset spacing therebetween, the spacing element further being configured to be disconnected from the base pressure skate element and from the pipe holder structure;

wherein the U-shaped pipe support supporting the pipe and the insulating material is supportable by one of a strut from below and a vertical hanger from above; and wherein the spacing element is snapfittedly connectable with at least one of the base pressure skate element and the pipe holder structure.

10. An insulation compression reduction assembly for reducing compression of an insulating material surrounding a horizontally extending pipe in combination with a U-shaped pipe support supporting the pipe, the compression reduction assembly comprising:

a base pressure skate element configured to engage with the U-shaped pipe support and being sized and shaped to be entirely positioned above an inner surface of the U-shaped pipe support;

a pipe holder structure sized and shaped to be at least partially received within the U-shaped pipe support and to rest against an outer surface of the horizontally extending pipe;

a spacing element being at least partially received within the U-shaped pipe support and connecting the base pressure skate element and the pipe holder structure and forming an offset spacing therebetween;

wherein the U-shaped pipe support supporting the pipe and the insulating material is supportable by one of a strut from below and a vertical hanger from above;

wherein the spacing element is shaped as a flat bar element; and wherein the base pressure skate element extends along a direction of the horizontally extending pipe, a length of the base pressure skate element in the direction of the horizontally extending pipe being substantially greater than a width of the base pressure skate element in a direction transverse to the horizontally extending pipe.

11. An insulation compression reduction assembly for reducing compression of an insulating material surrounding a horizontally extending pipe in combination with a U-shaped pipe support supporting the pipe, the compression reduction assembly comprising:

a base pressure skate element configured to engage with the U-shaped pipe support and being sized and shaped to be entirely positioned above an inner surface of the U-shaped pipe support;

a pipe holder structure sized and shaped to be at least partially received within the U-shaped pipe support and to rest against an outer surface of the horizontally extending pipe;

a spacing element being at least partially received within the U-shaped pipe support and connecting the base pressure skate element and the pipe holder structure and forming an offset spacing therebetween;

wherein the U-shaped pipe support supporting the pipe and the insulating material is supportable by one of a strut from below and a vertical hanger from above; and wherein the spacing element is snapfittedly connected with at least one of the base pressure skate element and the pipe holder structure.

12. An insulation compression reduction kit for reducing compression of an insulating material surrounding a horizontally extending pipe in combination with a U-shaped pipe support supporting the pipe, the compression reduction kit comprising:

a base pressure skate element sized and shaped to be fittable within the U-shaped pipe support;

a pipe holder structure sized and shaped to be receivable within the U-shaped pipe support and to be restable against an outer surface of the horizontally extending pipe; and a spacing element being receivable within the U-shaped pipe support and connectable to the base pressure skate element and the pipe holder structure for forming an offset spacing therebetween, the spacing element further being configured to be disconnected from the base pressure skate element and from the pipe holder structure;

wherein the U-shaped pipe support supporting the pipe and the insulating material is supportable by one of a strut from below and a vertical hanger from above;

wherein the spacing element is snapfittedly connected with at least one of the base pressure skate element and the pipe holder structure;

wherein the spacing element is shaped as a flat bar element; and wherein the base pressure skate element extends along a direction of the horizontally extending pipe upon being fitted within the U-shaped pipe support, a length of the base pressure skate element in the direction of the horizontally extending pipe being substantially greater than a width of the base pressure skate element in a direction transverse to the horizontally extending pipe.

13. The compression reduction kit of claim 12, wherein an entirety of the base pressure skate element is sized and shaped to fit over an inner surface of the U-shaped pipe support.

14. An insulation compression reduction assembly for reducing compression of an insulating material surrounding a horizontally extending pipe in combination with a U-shaped pipe support supporting the pipe, the compression reduction assembly comprising:

a base pressure skate element configured to engage with the U-shaped pipe support and being sized and shaped to be entirely positioned above an inner surface of the U-shaped pipe support;

a pipe holder structure sized and shaped to be at least partially received within the U-shaped pipe support and to rest against an outer surface of the horizontally extending pipe;

a spacing element being at least partially received within the U-shaped pipe support and connecting the base pressure skate element and the pipe holder structure and forming an offset spacing therebetween;

wherein the U-shaped pipe support supporting the pipe and the insulating material is supportable by one of a strut from below and a vertical hanger from above; and wherein the spacing element is further configured to be disconnected from the base pressure skate element and from the pipe holder structure.

15. An insulation compression reduction assembly for reducing compression of an insulating material surrounding a horizontally extending pipe in combination with a U-shaped pipe support supporting the pipe, the compression reduction assembly comprising:

a base pressure skate element configured to engage with the U-shaped pipe support and being sized and shaped to be entirely positioned above an inner surface of the U-shaped pipe support;

a pipe holder structure sized and shaped to be at least partially received within the U-shaped pipe support and to rest against an outer surface of the horizontally extending pipe;

a spacing element being at least partially received within the U-shaped pipe support and connecting the base pressure skate element and the pipe holder structure and forming an offset spacing therebetween;

wherein the U-shaped pipe support supporting the pipe and the insulating material is supportable by one of a strut from below and a vertical hanger from above; and wherein the base pressure skate element has a substantially smooth curved outer surface supported by a corresponding curved inner surface of the U-shaped pipe support.

16. An insulation compression reduction kit for reducing compression of an insulating material surrounding a horizontally extending pipe in combination with a U-shaped pipe support supporting the pipe, the compression reduction kit comprising:

a base pressure skate element sized and shaped to be fittable within the U-shaped pipe support;

a pipe holder structure sized and shaped to be receivable within the U-shaped pipe support and to be restable against an outer surface of the horizontally extending pipe; and a spacing element being receivable within the U-shaped pipe support and connectable to the base pressure skate element and the pipe holder structure for forming an offset spacing therebetween, the spacing element further being configured to be disconnected from the base pressure skate element and from the pipe holder structure;

wherein the U-shaped pipe support supporting the pipe and the insulating material is supportable by one of a strut from below and a vertical hanger from above; and wherein the base pressure skate element has a substantially smooth curved outer surface configured to be supported by a corresponding curved inner surface of the U-shaped pipe support.

* * * * *